(12) United States Patent
Peebler et al.

(10) Patent No.: US 12,469,226 B2
(45) Date of Patent: Nov. 11, 2025

(54) COMMUNICATION SESSIONS USING OBJECT INFORMATION

(71) Applicant: APPLE INC., Cupertino, CA (US)

(72) Inventors: Bradley W. Peebler, Redwood City, CA (US); Alexandre Da Veiga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 17/991,853

(22) Filed: Nov. 22, 2022

(65) Prior Publication Data

US 2023/0290078 A1 Sep. 14, 2023

Related U.S. Application Data

(63) Continuation of application No. PCT/US2021/032712, filed on May 17, 2021.

(60) Provisional application No. 63/031,971, filed on May 29, 2020.

(51) Int. Cl.
G06T 19/00 (2011.01)
G06F 3/14 (2006.01)

(52) U.S. Cl.
CPC .......... G06T 19/006 (2013.01); G06F 3/1454 (2013.01); *G06T 2219/024* (2013.01)

(58) Field of Classification Search
CPC .......... G06T 2219/024; G06T 2210/61; G06T 2210/04; G06T 19/006; G06T 2210/12; G06T 19/00; G06F 3/1454
See application file for complete search history.

(56) References Cited

U.S. PATENT DOCUMENTS

| 7,912,633 | B1 * | 3/2011 | Dietsch | G05D 1/0274 701/450 |
| 10,169,917 | B2 | 1/2019 | Chen et al. | |
| 11,151,744 | B1 * | 10/2021 | Konolige | G06V 30/19173 |
| 2007/0162863 | A1 * | 7/2007 | Buhrke | G06F 3/04815 715/857 |

(Continued)

OTHER PUBLICATIONS

European Patent Office (ISA/EP), International Search Report and Written Opinion of the International Searching Authority, International Application No. PCT/US2021/032712, 16 pages, Sep. 22, 2021.

(Continued)

*Primary Examiner* — Phi Hoang
(74) *Attorney, Agent, or Firm* — Thompson Hine LLP

(57) ABSTRACT

Various implementations use object information to facilitate a communication session. Some implementations create a dense reconstruction (e.g., a point cloud or triangular mesh) of a physical environment, for example, using light intensity images and depth sensor data. A less data-intensive object information is also created to represent the physical environment for more efficient storage, editing, sharing, and use. In some implementations, the object information includes object attribute and location information. In some implementations, a 2D floorplan or other 2D representation provides object locations and metadata (e.g., object type, texture, heights, dimensions, etc.) provide object attributes. The object location and attribute information may be used, during a communication session, to generate a 3D graphical environment that is representative of the physical environment.

23 Claims, 8 Drawing Sheets

(56) References Cited

U.S. PATENT DOCUMENTS

| | | | |
|---|---|---|---|
| 2007/0195085 A1* | 8/2007 | Farinelli | G06T 15/40 |
| | | | 345/421 |
| 2013/0035853 A1* | 2/2013 | Stout | G01C 21/3638 |
| | | | 701/438 |
| 2015/0193979 A1 | 7/2015 | Grek | |
| 2016/0027218 A1 | 1/2016 | Salter et al. | |
| 2016/0212180 A1 | 7/2016 | Menezes et al. | |
| 2016/0234475 A1 | 8/2016 | Courchesne et al. | |
| 2017/0365104 A1* | 12/2017 | McMahon | G06T 19/20 |
| 2019/0026957 A1 | 1/2019 | Gausebeck | |
| 2020/0225673 A1* | 7/2020 | Ebrahimi Afrouzi | |
| | | | A47L 11/4011 |
| 2020/0319710 A1* | 10/2020 | Tadi | G06F 3/017 |
| 2021/0099146 A1* | 4/2021 | Lee | G06T 7/73 |
| 2021/0256674 A1* | 8/2021 | Shreve | G06T 7/136 |
| 2022/0408213 A1* | 12/2022 | Mohalik | H04L 67/125 |

OTHER PUBLICATIONS

Kurillo, G. et al., "Teleimmersive 3D Collaborative Environment for Cyberarchaeology," Computer Vision and Pattern Recognition Workshops (CVPRW), 2010 IEEE Computer Society Conference, pp. 23-28, Jun. 2010

Srirangamsridharan, S. et al., "Object Localization and Size Estimation from RGB-D Images," arxiv.org, Cornell University Library, Ithaca, NY, 5 pages, Aug. 2018.

* cited by examiner

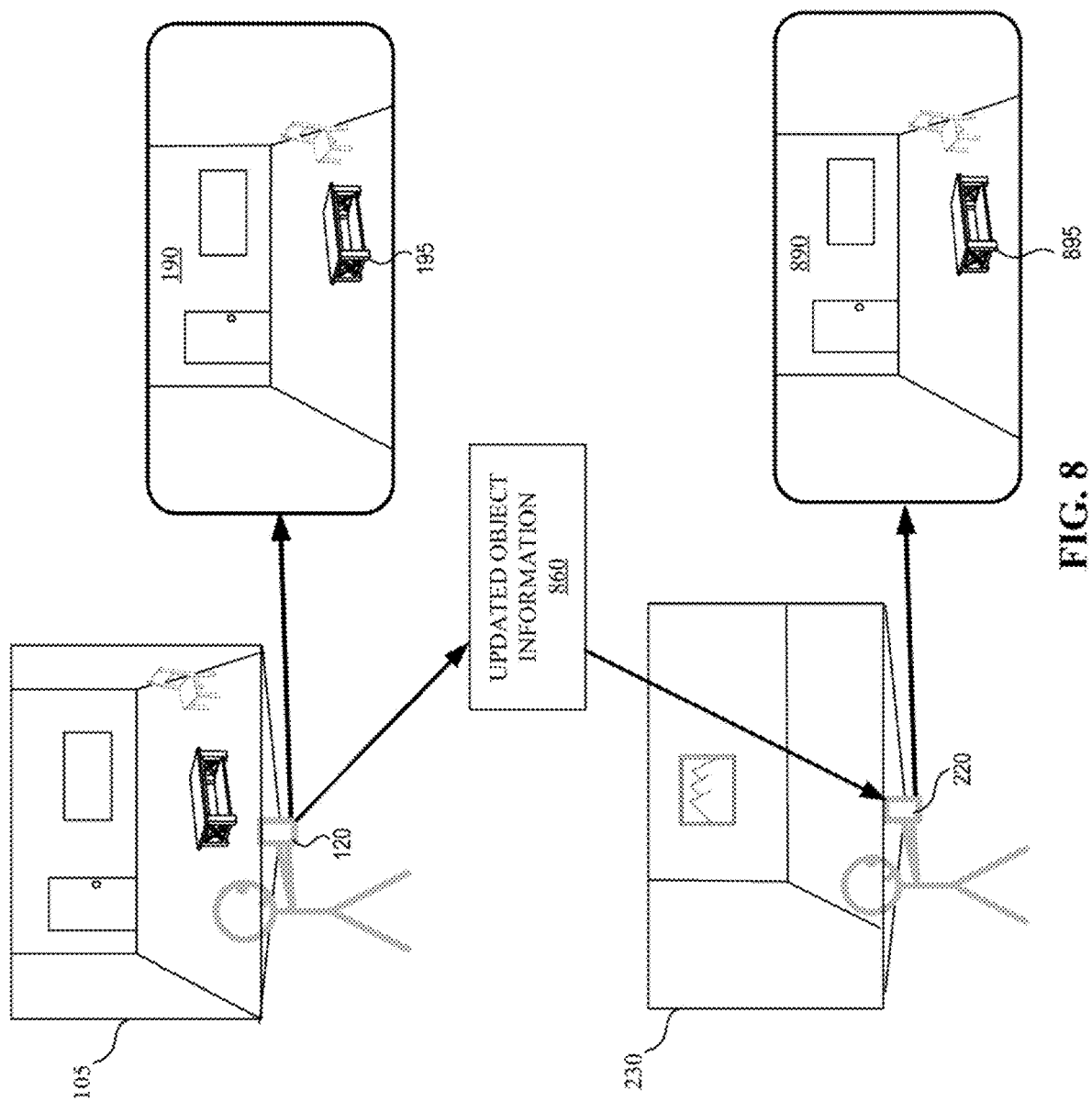

COMMUNICATION SESSIONS USING OBJECT INFORMATION

CROSS-REFERENCE TO RELATED APPLICATIONS

This patent application is a continuation of International Application No. PCT/US2021/032712 filed May 17, 2021, which claims the benefit of U.S. Provisional Patent Application No. 63/031,971 filed May 29, 2020, entitled "COMMUNICATION SESSIONS USING OBJECT INFORMATION," each of which is incorporated herein by this reference in its entirety.

TECHNICAL FIELD

The present disclosure generally relates to techniques for efficiently providing audio and visual communications.

BACKGROUND

Audio and visual communication sessions can involve the transmission of visual information over network communication channels. For example, if the image sensor of a participant's device is pointed at a desk in the participant's physical environment, the device may transmit a captured representation of the desk to another participant in the communication session. Transmission of photorealistic imagery can be data-intensive.

SUMMARY

It is desirable to enable a high level of user experience using less data-intensive techniques. Various implementations disclosed herein include devices, systems, and methods that create, edit, store, share, and/or use object information to capture, represent, and present characteristics of physical environments. Some implementations create a dense reconstruction (e.g., a point cloud or triangular mesh) of a physical environment, for example, using light intensity images and depth sensor data. Some implementations additionally, or alternatively, create less data-intensive object information to represent the physical environment for more efficient storage, editing, sharing, and use. In some implementations, the object information includes object attribute and location information. In some implementations, the object information includes location information in the form of a 2D floorplan or other 2D representation. The object information may include attributes that identify object type, texture, height, dimensions, and/or other object characteristics of the objects represented in such a 2D representation. In other implementations, the object information includes location information in the form of a representation that identifies coordinate (e.g., x,y,z) positions for relatively large objects (e.g., tables, chairs, walls, windows, water bottles, etc.). The object information may include attribute information from which the shapes of such objects can be determined. These types of attribute information can include object type, texture, dimensions, and/or object characteristics. In some implementations, object information is generated from a dense reconstruction of a physical environment. In other implementations, object information is generated directly from sensor data obtained in the physical environment.

The object location and attribute information may be used to generate a 3D graphical environment that is representative of the physical environment. In some implementations, a 3D graphical environment is generated by generating and positioning 3D representations of one or more objects of the physical environment. The object attributes include semantic and/or dimensional information (e.g., object types, dimensions, model numbers, color, texture types, material types, etc.) that may be used to select or synthesize 3D representations of the objects. The object location information (e.g., a 2D floorplan) and/or the object attributes (e.g., height, dimension, etc.) may be used to position the 3D representations of the objects in a graphical environment. In one example, a floorplan identifies the locations of a table, walls, and a chair on a horizontal plane and object attributes identify the dimensions of the table and its color, the colors and heights of the walls, and a semantic label identifies a type of the chair. This object information may be used to select or synthesize and position 3D representations of the table, walls, and chair in a graphical environment so that the graphical environment is the same as or similar to the physical environment.

Using object information (e.g., a 2D floorplan and object attribute information) that is less data-intensive than a dense 3D reconstruction to represent the physical environment may enable faster and/or more efficient storage and/or transmission of 3D environment representations. Using less data-intensive object information may facilitate fast and efficient transmissions for shared environments, enable people such as interior designers to share their 3D environment creations, and enable the use of tools that allow editing of a 3D environments using non-3D object representations such as by editing elements of a 2D floorplan, amongst numerous other benefits.

In some implementations, using less data-intensive object information (e.g., a 2D floorplan and object attribute information) representing a physical environment rather than a dense reconstruction facilitates a communication session in which the visual appearance of a physical environment proximate a device is shared with an external device. For example, two users using respective devices may engage in a communication session with one another in which one of the users shares his or her physical environment with the other. For example, the first user's device (e.g., the sharing device) may provide a view of the physical environment that is around the first user, generate object information representing the objects in that physical environment, and share that object information with the second user, whose device (e.g., the receiving device) uses the object information to provide a graphical environment that is similar to the physical environment of the first user's device.

Some implementations relate to a communication session in which a first device (e.g., the receiving device) produces a graphical environment based on object information that the first device receives from a second device (e.g., the sharing device). The first device uses the object information to produce a graphical environment that resembles the physical environment around the second device. The object information (e.g., a 2D floorplan plus object attributes) identifies the locations and attributes of objects in the physical environment around the second device and may be generated by the second device based on its RGB, depth, or other sensor data. The first device uses the object information that it receives to select or synthesize 3D representations of objects and then position the representations in the graphical environment. The object information uses relatively little data (e.g., only a 2D floorplan and metadata) and thus can be stored and transmitted more efficiently and quickly than photorealistic models (e.g. dense 3D meshes). In some instances, the object information can include texture and sizing information that allows the first device to reproduce a realistic representation of the source object without incurring the inefficiencies of transmitting quantities of photorealistic content.

In some implementations, program instructions stored on a non-transitory computer-readable storage medium are executable on a first device to perform operations. The operations include providing a communication session with a second device via wireless communication. The operations include receiving object information indicating attributes (e.g., object type, height, dimensions, color, texture, material, sound properties, pixel swatch, etc.) and locations (e.g., represented as a 2D floorplan, coordinate positions, etc.) of objects in a physical environment in which the second device is located. The attributes and locations of the objects are determined using sensor data captured by one or more image sensors in the physical environment.

The operations also include generating 3D representations of the objects using the attributes of the objects. For example, a 3D representation may be generated by selecting a 3D object model via an asset store or by generating a new model based on the attributes. In some implementations, the generation of a 3D representation depends upon the amount of detail in the object information. For example, an asset hierarchy may be used and accessed according to different specificity levels, e.g., providing a generic rectangle for a TV versus a specific brand/model TV depending upon the level of detail provided in the object information.

The operations also include determining 3D positions for the 3D representations of the objects in a coordinate space of a graphical environment using the locations of the objects in the physical environment. The position of the representation (of the object) may be based on the location of the object in the physical environment. For example, and object's location may provide coordinates (e.g., x, y, z) representing its center point relative to a coordinate system in the physical environment. The operations can also include determining attributes for the 3D representations of the objects. For example, an object's attributes may provide a model number and known height, width, length dimensions. The operations can also include a source for obtaining further information regarding the object. For example, a source repository may house a plurality of predetermined objects, such as desks and chairs, that can be used to populate an office environment.

In some examples, a 2D floorplan provides a 2D perimeter of the object from a particular perspective, e.g., a top down perspective. By identifying an object's perimeter, such a 2D floorplan may provide 2D coordinate (e.g., x, y) positions of parts (e.g., sides, corners, etc.) of the object as well as the object's 2D dimensions (e.g., length and width) in the horizontal (e.g., x, y) directions. The object's attributes, stored in metadata, can provide height information and/or other information to enable the rendering of a spatially accurate 3D representation of the object.

The operations further comprise, in accordance with determining the 3D positions for the 3D representations of the objects, generating a graphical environment including the 3D representations of the objects. During the communication session, a first view of the graphical environment at the first device and a second view of the physical environment at the second device are presented simultaneously.

For example, a second user in his living room may view his living room via his or her device while a first user in another location may view a graphical representation of the second user's living room at the same time. Moreover, the communication session may allow interactions during the communication. For example, the first user may position a virtual vase on the real table in the second user's living room and both users may view the virtual apple vase on the table via their respective devices.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 illustrates an exemplary communication session in accordance with some implementations.

Figure 1:
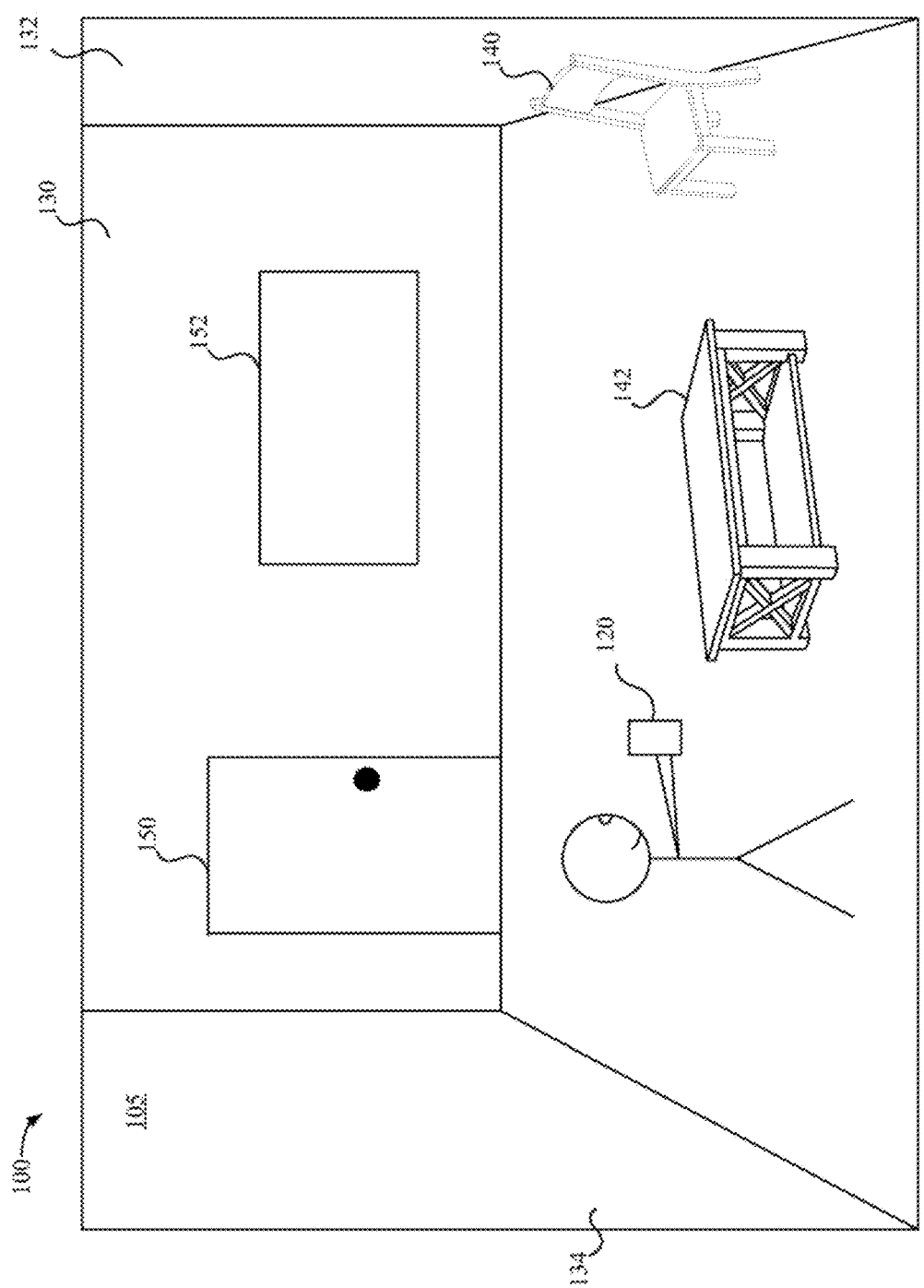
FIG. 1 illustrates an exemplary operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary operating environment 100 in which electronic device 120 is used in physical environment 105. A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. The physical environment 105 includes walls 130, 132, 134, chair 140, table 142, door 150, and window 152. Device 120 includes one or more cameras that can be used to capture representations of objects 130, 132, 134, 140, 142, 150, and 152.

In the example of FIG. 1, the device 120 is illustrated as a single device. Some implementations of device 120 are hand-held. For example, device 120 is a mobile phone, a tablet, a laptop, so forth. In some implementations, device 120 is worn by a user. For example, device 120 is a watch, a head-mounted device (HMD), head-worn device (glasses), so forth. In some implementations, functions of the device 120 are accomplished via two or more devices, for example additionally including a base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of device 120 may communicate with one another via wired or wireless communications.

Figure 2:
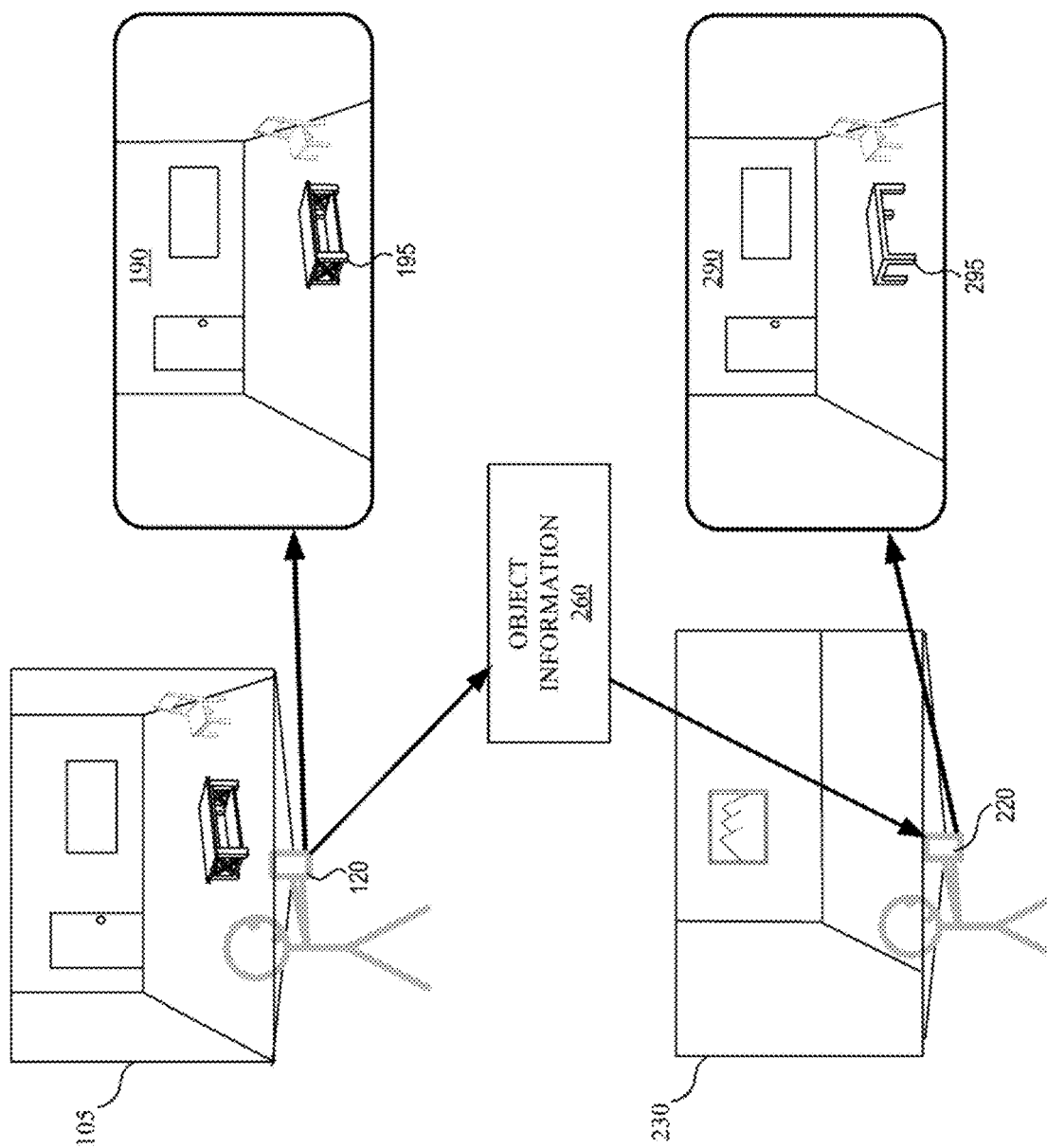
FIG. 2 illustrates an exemplary communication session in accordance with some implementations.

FIG. 2 illustrates an exemplary communication session involving a sharing device (e.g., 120) and a receiving device (e.g., 220), in accordance with some implementations. Exemplary device 120 shares information describing the physical environment 105 with device 220 so both devices can present common elements, such as depictions of objects located in physical environment 105, to their users simultaneously. In other words, during the communication session, the view 190 at the device 120 and the view 290 at the device 220 are presented simultaneously. While it is possible to transmit photo-realistic imagery between devices 120 and 220, doing so is data-intensive and can detract from the user experience, particularly when network bandwidth limits introduce latency.

The information that is presented by devices 120 and 220 vary with device positioning and orientation. For example, the user of device 120 is viewing the physical environment 105 from a first position and the user of device 220 is viewing a representation of the physical environment 105 from a different second position. A viewing position is sometimes called a viewpoint. The information that is presented by devices 120 and 220 can include one or more representations, such as cartoon avatars or photo-realistic avatars, of the users of the devices. For example, device 120 presents a first view that includes elements representative of the physical environment 105 and an avatar representation of the user of the second device 220, while device 220 presents a second view that includes elements representative of physical environment 105 and an avatar representation of the user of the first device 120. Devices 120 and 220 can coordinate so that some virtual content is presented by both devices. For example, both the first and second views can present a common virtual content item, e.g., a vase, on top of the table 142.

During the exemplary communication session of FIG. 2, view 190 provided by device 120 includes elements of the physical environment 105 in which device 120 is physically located, such as live visual content captured by one or more image sensors of the device 120. View 190 may be called a generated view in the sense that it is, in some examples, rendered based on a dense reconstruction of the physical environment 105 that device 120 generates using image sensor data, such as image sensor(s), depth sensor(s), and/or event sensor(s).

In addition to providing view 190 locally, device 120 creates object information 260 representing elements of the physical environment 105. This object information 260 may be transmitted to the second device 220 during the communication session. In some implementations, the object information 260 includes information about real objects in the physical environment 105.

Optionally, the object information 260 that is created by device 120, used in providing view 190 locally, and transmitted to device 220 during a communication session includes information of virtual objects. The virtual object(s) can be introduced into the communication session by a user of device 120. For example, a user may instruct device 120 to place, in view 190, a virtual vase object such that the virtual vase appears to reside on top of a horizontal surface (e.g., a table top) in the view. Device 120 may share information regarding this virtual object with device 220 so that a user of device 220 experiences an immersive communication experience with the user of device 120.

In some implementations, object information 260 includes object attribute and location information. Possible attributes of an object include dimensions such as height, width, depth, thickness, so forth. Attributes can also include object type, color, style, so forth. Object types and object style in some implementations each specifies one of various possible predetermined types and styles. For example, an object type could be a table, and an object style could include an indication of whether the table is simple or ornate. Object types and styles optionally belong within a taxonomy of types and styles. For example, "chairs" and "tables" can belong within a parent taxonomy of "dining sets" or "furniture".

Possible location information includes object position, which may specify coordinates in a coordinate system. Location information can also include orientation. Location information can also include a partial (or more) layout of the physical space in which the object is located. For example, a layout is a 2D floorplan or other spatial mapping information. In this way, object information 260 supports the creation of a dimensionally-accurate and aesthetically compatible table object without having to transit photo-realistic data and/or dense 3D model data regarding the object, thereby conserving data bandwidth and improving latency.

In some implementations, device 120 generates object information 260 using machine learning models. As examples, one or more machine learning models may be used to detect objects, classify objects (e.g., with semantic labels corresponding to object type, model, color, texture, etc.), assess object dimensions, or otherwise determine object attributes using information from one or more cameras of device 120. For instances, as the camera(s) of device 120 scans object 195, device 120 is able to determine a high probability that object 195 is a table. A high probability in some implementations is a probability that exceeds a threshold.

Returning to FIG. 2, device 220 is located in a physical environment 230 away from physical environment 105, in which the device 120 is located. After receiving object information 260, device 220 uses the object information 260 to generate a 3D graphical representation of elements from remote physical environment 105. Further, device 220 provides a view 290 of the 3D graphical environment. In this way, device 290 presents elements of remote physical environment 105 (where device 120 is) so that users of both devices can participate in a shared communication experience, viewing shared objects from different physical locations and relative viewpoints at the same time.

In some implementations, object information 260 includes information about one or more of the position, size, shape, and orientation of table 195. Object information 260 does not include photo-realistic imagery of table 195 in some implementations. That is, object information 260 does not include photo-realistic pictures, photo-realistic volumetric data, or 3D models of table 195. Nonetheless, using object information 260, device 220 is able to present a table 295 of the same size, shape, and orientation in view 220. Representation 295 allows the user of device 220 to appreciate that the object is a table even though representation 295 may have a style that is different from table 195 as table 295 is reconstructed from basic meta-data conveyed by object information 260.

In some implementations, device 120 provides object information 260 regarding virtual objects. For example, a user of device 220 may instruct device 220 to place a virtual object, such as a vase, on top of table 195. Object information 260 may include the above-described parameters. Object information 260 may also indicate the relationship between the virtual object and table 195, such as the virtual vase being anchored to table 195. In this way, device 220, upon receiving object information 260, may recreate the virtual vase, a representation of table 195, and place the virtual vase in proper position and orientation relation with table representation 295.

According to some implementations, the device 120 and/or device 220 generate and present an extended reality (XR) environment to their respective users. An extended reality (XR) environment refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

Figure 3:
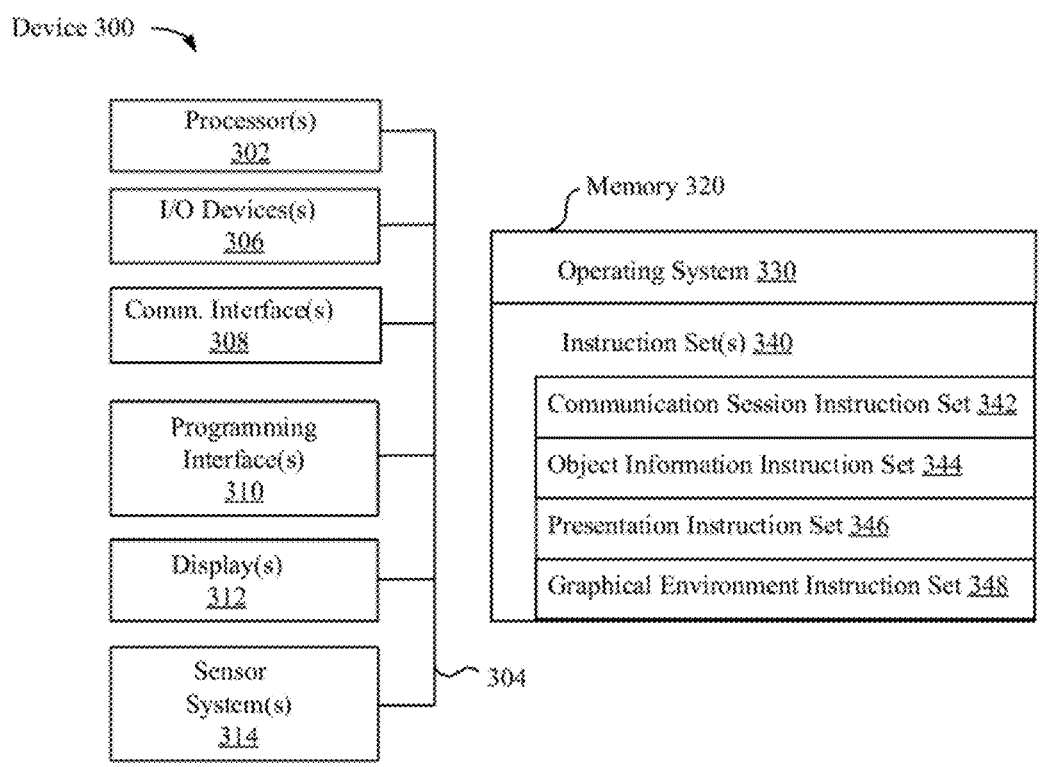
FIG. 3 is a block diagram of an exemplary device in accordance with some implementations.

FIG. 3 is a block diagram of an example device 300. Device 300 illustrates an exemplary device configuration for device 120 and device 220. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processors 302, one or more input/output (I/O) devices 306, one or more communication interfaces 308, one or more programming (e.g., I/O) interfaces 310, one or more displays 312, one or more sensor systems 314, a memory 320, and one or more communication buses 304 for interconnecting these and various other components.

In some implementations, the one or more communication buses 304 include circuitry that interconnects and controls communications between system components.

In some implementations, the one or more processors 302 include microprocessors, ASICs, FPGAs, GPUs, CPUs, processing cores, and/or the like.

In some implementations, the one or more communication interfaces 308 include USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface.

In some implementations, the one or more displays 312 are configured to present a view of a physical environment or a graphical environment to the user. In some implementations, the one or more displays 312 correspond to digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), holographic, and/or the like display types. In some implementations, the one or more displays 312 correspond to diffractive, reflective, polarized, holographic, etc. waveguide displays.

In some implementations, the one or more sensor systems 314 include an image sensor, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like. The one or more sensor systems may be configured to obtain image data that corresponds to at least a portion of the physical environment 105. For example, the one or more sensor systems 314 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more sensor systems 314 further include illumination sources that emit light, such as a flash. In various implementations, the one or more sensor systems 314 further include an on-camera image signal processor (ISP) configured to execute a plurality of processing operations on the image data.

The memory 320 includes high-speed random-access memory. Examples of random-access memory include DRAM, SRAM, DDR RAM, and other random-access solid-state memory devices. In some implementations, the memory 320 includes non-volatile memory, such as one or more magnetic disk storage devices, optical disk storage devices, flash memory devices, or other non-volatile solid-state storage devices. The memory 320 may include one or more storage devices remotely located from the one or more processors 302. The memory 320 comprises a non-transitory computer readable storage medium.

In some implementations, the memory 320 or the non-transitory computer readable storage medium of the memory 320 stores an optional operating system 330 and one or more instruction set(s) 340. The operating system 330 includes procedures for handling various basic system services and for performing hardware dependent tasks. In some implementations, the instruction set(s) 340 include executable software defined by binary information stored in the form of electrical charge. In some implementations, the instruction set(s) 340 are software that is executable by the one or more processors 302 to carry out one or more of the techniques described herein.

The instruction set(s) 340 include a communication session instruction set 342, an object information instruction set 344, a presentation instruction set 346, and a graphical environment instruction set 348. The instruction set(s) 340 may be embodied as a single software executable or multiple software executables.

The communication session instruction set 342 is executable by the one or more processors 302 to send and/or receive messages with an external device during a communication session. Such information may include object information provided by execution of the object information instruction set 344 and other information. In some implementations, communication session instruction set 342 is executed to implement a communication session via electronic messages or signals transmitted via one or more wireless or wired communication networks.

The object information instruction set 344 is executable by the one or more processors 302 to create object information. In some implementations, the object information instruction set 344 is executed to obtain sensor data (e.g., image data such as light intensity data, depth data, camera position information, etc.), generate a dense 3D representation/3D model (e.g., a 3D mesh representation, a 3D point cloud, or the like), and create object information using the dense 3D representation. In some implementations, the object information instruction set 344 is executed to create object information directly from sensor data without generating a dense 3D representation/3D model, e.g., using image data such as light intensity data, depth data, camera position information, etc.

In some implementations, the object information instruction set 344 is executed to implement a machine learning model to create object attributes to include in the object information. As examples, one or more machine learning models may be used to detect objects, classify objects (e.g., with semantic labels corresponding to object type, model, color, texture, etc.), assess object dimensions, or otherwise determine object attributes.

In some implementations, the object information instruction set 344 is executed to determine object locations to include in the object information. For example, the object information instruction set 344 may determine coordinate (e.g., x,y,z) positions of object center points and/or corner points, determine bounding box locations and sizes around objects, or determine 2D representations such as 2D floor-plans. One or more machine learning models may be used to determine object locations, for example, based on sensor data and/or a dense 3D reconstruction of a physical environment.

The presentation instruction set 346 is executable by the one or more processors 302 to present a view of a physical environment or a graphical environment. In some implementations, the presentation instruction set 346 is executed to define a position of a device relative to the physical environment (e.g., in a coordinate system of the graphical environment) or a corresponding graphical environment (e.g., in a coordinate system of the graphical environment) and move the position of the device based on real-world movements of the device. In some implementations, the presentation instruction set 346 is executed to track a movement or positioning (e.g., pose) of the device relative to a coordinate system of the physical environment or the graphic environment. The presentation instruction set 346 is executed to determine and/or adjust the view of a physical environment or graphical environment based on such movement or positioning. For example, the presentation instruction set 346 may be executed to provide a view that changes as the device is moved or rotated. As a specific example, as the user turns the device to face left, executed instructions of the presentation instruction set 346 may change the view to show objects that are to the left of the device's position in the physical environment or graphical environment. As another example, as the user moves the device forward, executed instructions of the presentation instruction set 346 may change the view to show the objects from a correspondingly closer perspective based on objects now being relatively closer to the device's position.

The graphical environment instruction set 348 is executable by the one or more processors 302 to generate a graphical environment, such as a 3D graphical environment. The graphical environment instruction set 348 may be executed to create 3D representations of objects based on object information, for example, as part of generating a 3D graphical environment. The graphical environment instruction set 348 may be executed to determine 3D representations of the objects using the attributes of the objects in object information received during a communication session. For example, this may involve obtaining object representations by selecting 3D object models via an asset store or generating a new model based on the attributes. In some implementations, a 3D representation may be selected or generated based upon the amount of object attribute detail that is available in object information received during a communication session.

The graphical environment instruction set 348 may determine positions for the 3D representations of the objects in a coordinate space of a graphical environment. The positions for the representations may be determined using received object information. The positions of the 3D representations may be based on object information that identifies the object's physical environment location in a physical environment and/or the object's attributes. The attributes of the object information may also be used. For example, the object information may identify a location of an object's center point (e.g., x,y,z coordinates), the object's orientation, and the object's brand and model number. The brand and model number may be used to identify a representation of the object in an asset factory to determine the width, height, and length dimensions of the object. A representation of the object can then be created with the appropriate dimensions and positioned in an appropriate position and orientation in a graphical environment that corresponds to the physical environment in which the object is found.

In another example, the object information includes a 2D floorplan and attributes. The 2D floorplan, in this example, provides an x, y locations of a perimeter of the object and thus provides two coordinates (x,y) of the object's position as well as the object's dimensions, shape, and size in the x and y directions. In this example, the object's attributes include additional information about the object's appearance, dimensions, shape, and size (e.g., identifying the object's height, distance above floor, color, type, etc.). In some implementations, an object's dimensions and/or type are used to select a corresponding asset from a stored asset collection, e.g., selecting a table that has the same length, width, and height dimensions (or ratios). In some implementations, an object's 2D perimeter shape (e.g., from the top down perspective of a 2D floorplan) may be used to select a corresponding asset from a stored asset collection.

Although the instruction set(s) 340 are shown as residing on a single device, it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

The device configuration illustrated by device 300, in some implementations, is used for each of multiple devices involved in a communication session. For example, a first device, e.g., device 120, may have the configuration of device 300 during a communication session with a second device, e.g., device 220, in which the first device shares object information with the second device so that both devices can simultaneously view an environment corresponding to the physical environment proximate the first device. In other implementations, the devices involved in a communication session differ from one another. For example, the device sharing object information may include an image sensor system and an object information instruction set while a device receiving and using the object information need not include an image sensor system and/or object information instruction set.

Figure 4:
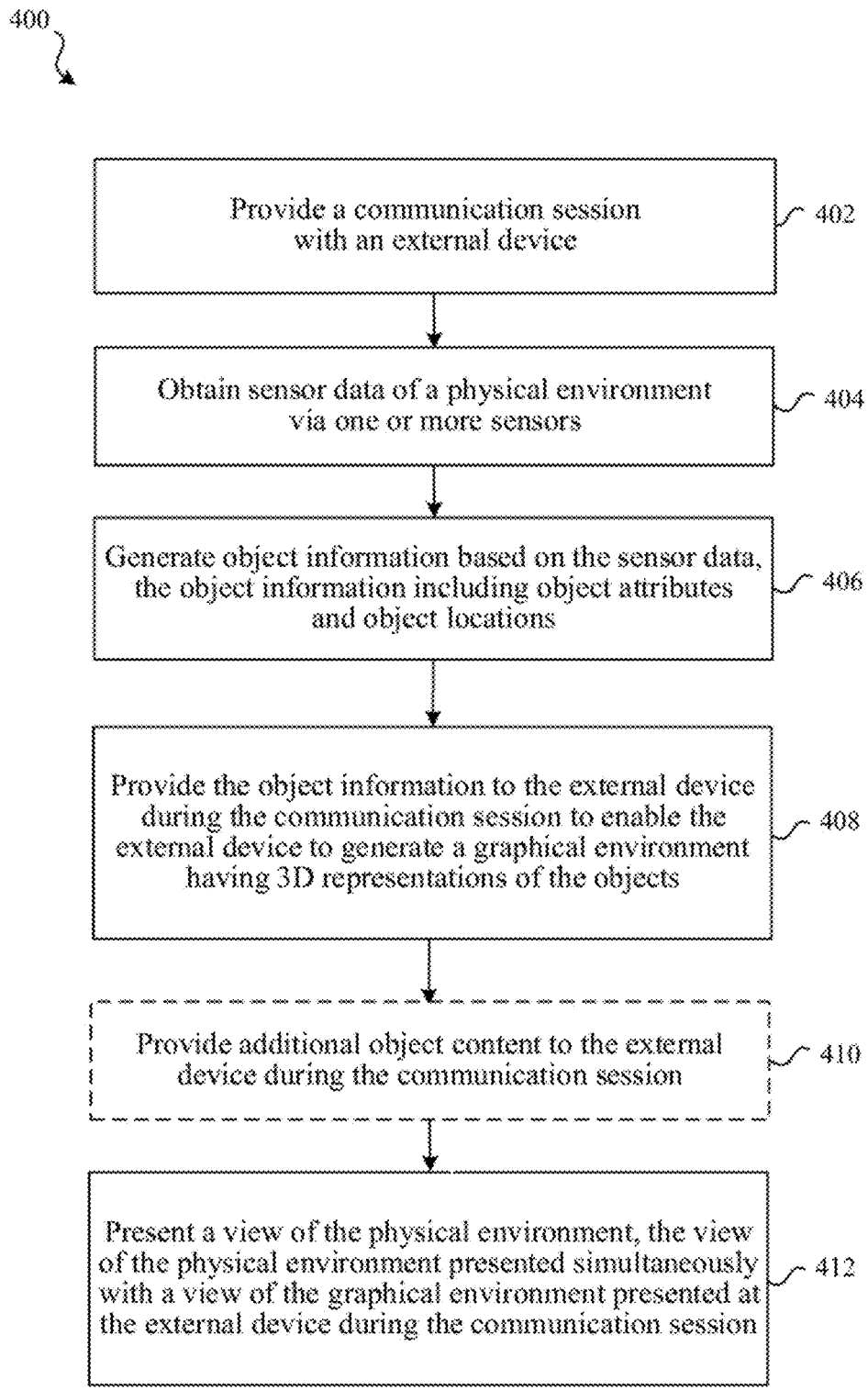
FIG. 4 is a flowchart illustrating sharing object information to facilitate a communication session in accordance with some implementations.

FIG. 4 is a flowchart illustrating an exemplary method 400. In some implementations, a sharing device such as device 120 (FIG. 2) performs the techniques of method 400 to provide object information that facilitates a communication session in which information regarding its local physical environment is shared with a remote, external device. In some implementations, the techniques of method 400 are performed on a mobile device, desktop, laptop, HMD, or server device. In some implementations, the method 400 is performed on processing logic, including hardware, firmware, software, or a combination thereof. In some implementations, the method 400 is performed on a processor executing code stored in a non-transitory computer-readable medium (e.g., a memory).

At block 402, the method 400 provides a communication session with an external device. The communication session may include visual information that enables one or both of the participants in the communication session to share the visual content such as the appearance of a physical environment or objects therein. The communication session may be established via direct communications with the external device, communications via a network, and/or via communications that involve other device's such as one or more servers configured to coordinate information shared between devices during the communication session.

At block 404, the method 400 obtains sensor data of a physical environment via one or more sensors. The sensor data (e.g., light intensity data and depth data) may include data for multiple points in time, e.g., for a sequence of image frames. The sensor data may include light-intensity images (e.g., greyscale images, RGB images, etc.) from one or more cameras, depth sensor images from one or more depth sensors, ambient light data from one or more ambient light sensors, motion data from accelerometers, gyroscopes, etc., and/or other types of data from other types of sensors. The sensor data (e.g., light intensity data, depth data, ambient light data, motion data, etc.) may be integrated (e.g., fused) using one or more known techniques.

At block 406, the method 400 generates object information based on the sensor data, the object information including object attributes and object locations. The object attributes and object locations are determined using the sensor data. In some implementations, sensor data obtained at block 404 is used to generate the object information.

In some implementations, the sensor data is used to generate a dense reconstruction and the object information is extracted from or otherwise determined using the dense reconstruction. For example, depth image data and intensity image data may be used to generate a dense 3D representation such as a dense 3D point cloud. The dense 3D representation may also be voxelized.

The object information may include, or be created based on, semantic information that is derived from the sensor data. For example, a semantic segmentation or other semantics-based computer vision technique may be used to assign semantic labels to pixels of light intensity images or semantic labels for points or voxels of a dense 3D representation of the physical environment. Such semantic information may be determined via an algorithm or machine learning model applied to image data. In some implementations, the machine learning model is a neural network (e.g., an artificial neural network), decision tree, support vector machine, Bayesian network, or the like. In some implementations, each semantic label includes a confidence value. For example, a particular point may be labeled as an object (e.g., table), and a data point could include coordinate (e.g., x, y, z) positions and a confidence value as a decimal value (e.g., 0.9 to represent a 90% confidence the semantic label has classified the particular data point correctly). In some implementations, a 3D reconstructed mesh may be generated as the semantic 3D representation.

In some implementations, the object information includes locations of objects in the physical environment that are at least partially represented using a 2D floorplan, e.g., a top down view/pixel grid of the objects in a room relative to one another, where pixel positions correspond to horizontal positions and distances in two dimensions, e.g., east-west and north-south, etc. A 2D floorplan may be provided in various formats. In some implementations, a 2D floorplan includes a 2D top-down view of a room including the room's walls, windows, doors, furniture, and other relatively large objects. A floorplan may depict a boundary of a room, e.g., by depicting walls, barriers, or other limitations of the extent of a room, using lines or other features represented in pixel positions. A 2D floorplan may depict the locations and geometries of wall features such as wall edges, doors, and windows. A 2D floorplan may include identifiers that identify the boundaries, walls, doors, windows, and objects in a room, e.g., including text labels or reference numerals that identify such elements. A 2D floorplan may include values representing distances and other measurements of boundaries, wall edges, doors, windows, and objects in a room, e.g., including numbers designating a length of a wall, a diameter of a table, a width of a window, etc.

According to some implementations, a 2D floorplan is created by flattening a dense 3D reconstruction of a physical environment. A floorplan may use a 2D pixel grid to represent the 2D shapes of 3D objects represented in a dense 3D reconstruction. In one example, a floorplan represents the 2D shapes of the 3D objects from a top-down viewing perspective by representing the outermost edges or surfaces of each 3D object viewed from the top-down perspective. In addition to a floorplan including a 2D pixel grid representing the 2D shapes of objects, a floorplan may include metadata with additional information about those objects. In one example, a floorplan includes metadata based on information represented in a dense 3D reconstruction. A dense 3D reconstruction may include points or nodes that are labelled with semantic labels identifying the object type or object attributes of each. In one example, each point of a set of points representing the 3D shape of an object is labelled "table" in a semantically-labelled 3D reconstruction. In this example, a floorplan is created that includes a corresponding portion that depicts the 2D shape of the table and includes metadata that associates the portion of the floorplan with the semantic label "table." A floorplan may additionally, or alternatively, include metadata from other sources. In one example, a floorplan incorporates semantic labels from one or more images of a physical environment based on identifying that semantically-labelled pixels or pother portions in the semantically-labelled images correspond to pixels or portions of the floorplan.

In some implementations, a 2D floorplan is created based on a user performing a room scan, e.g., moving a mobile device to capture images and depth data around the user in a room. In some implementations, a 2D floorplan may be generated based on separately identifying wall structures (e.g., wall edges, door, and windows) and other types of objects. Generating a 2D floorplan may involve detecting bounding boxes for objects (e.g., furniture, appliances, etc.). The wall structures and various objects may be detected separately and may be detected using differing techniques. The results of such detections may be combined to generate a 2D floorplan that represents both the wall structures and the various other objects.

At block 408, the method 400 provides the object information to the external device during the communication session to enable the external device to generate a graphical environment having 3D representations of the objects. The object information may be provided as an alternative to providing a dense 3D reconstruction of the physical environment. Some implementations obtain a dense 3D reconstruction of a physical environment and flatten the dense 3D reconstruction down into object information using less data than a dense 3D reconstruction would require. The object information may require less storage and/or transmission resources and may be provided and used more quickly by a receiving device, for example, during the communication session. In one example, object information includes relatively compact information in the form of a 2D floorplan and object attributes and a receiving device uses the floorplan and object attributes to generate a dense 3D reconstruction, e.g., effectively lifting or expanding the 2D floorplan into three dimensions.

In some implementations, object information is updated over time. For example, during a first period of a communication session relatively high-level object information may be provided and, during a later period of the communication session, relatively more detailed object information may be provided. The external device receiving the object information over time may update its graphical environment accordingly. Increasing the level of detail in the object information over the course of a communication session may provide various benefits. For example, doing so may enable the external device to generate a graphical environment earlier in the communication session than otherwise. For example, more detailed information may be unavailable during a first (e.g., initial) time period during the communication session and providing the higher-level object information during that time may enable the external device to display at least some representation of the physical environment rather than being unable to display anything.

At block 410, the method 400 optionally provides additional object content to the external device during the communication session. For example, based on determining that sufficient communication bandwidth is available, the method 400 may determine to transmit a photorealistic image of an object. In another example, the method 400 provides additional object content to incrementally increase the level of detail of the object over time. The type and/or amount of additional object content may depend upon available communication bandwidth. For example, when significant bandwidth is or becomes available, the method 400 may transmit a photorealistic image or other content representing the actual texture of a surface of an object and/or a dense 3D reconstruction of the object.

At block 412, the method 400 presents a view of the physical environment. The view may be presented simultaneously with a view of the graphical environment presented at the external device during the communication session.

Figure 5:
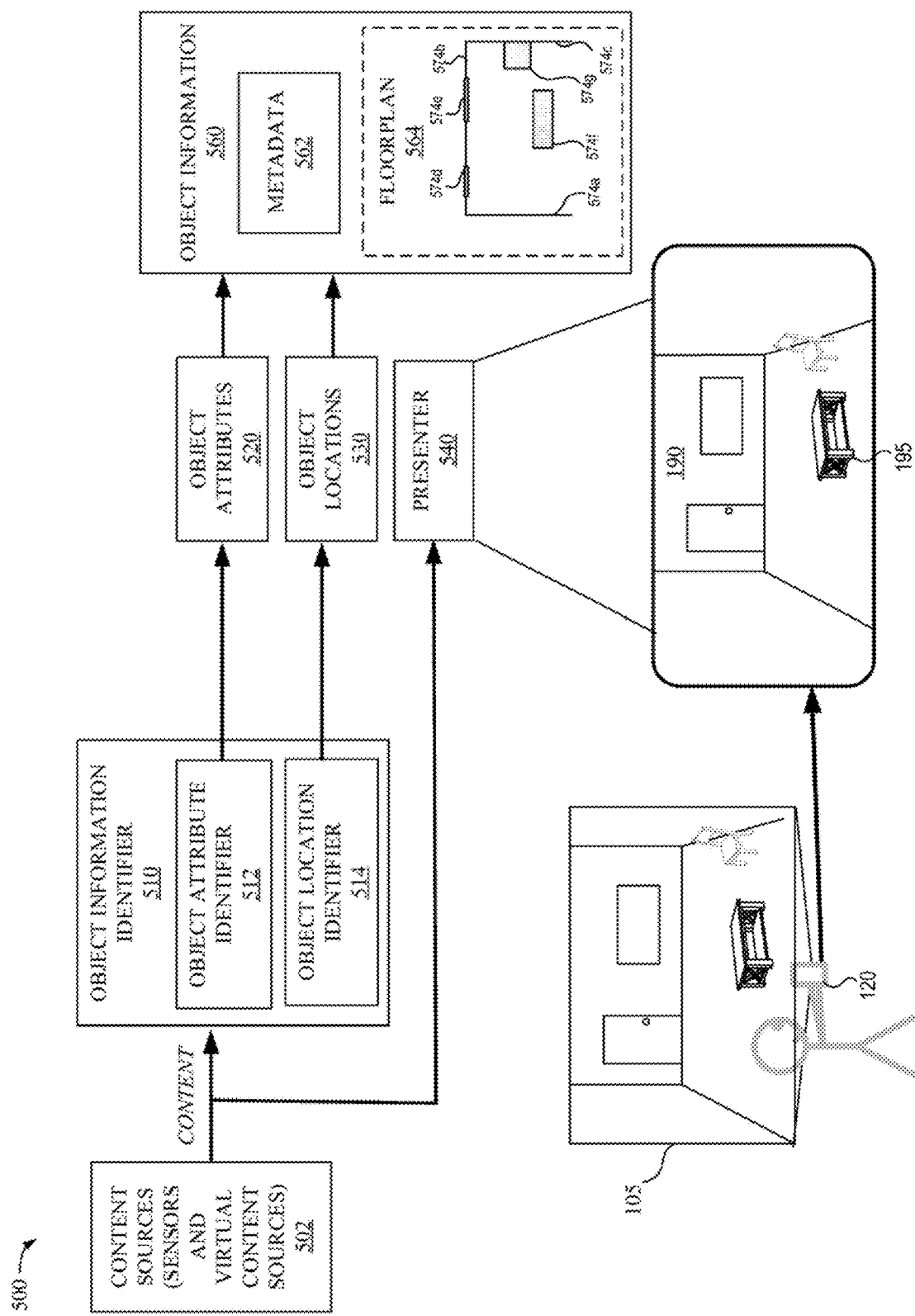
FIG. 5 illustrates providing a view of a physical environment while sharing object information in a communication session in accordance with some implementations.

FIG. 5 illustrates technique 500 for creating object information in accordance with some implementations. In this example, one or content sources 502 (e.g., sensors and/or virtual content sources) provide content. Content can be sourced from a combination of hardware and software sources. In some examples, content sources 502 include sensors that collect sensor data about a physical environment. These sensors also can include one or more of image cameras, event cameras, depth sensor images that produce images. These sensors also can include depth sensors that create point clouds or other kinds of depth data. These sensors can include accelerometers and gyroscopes that provide motion information. In some examples, content sources 502 obtain virtual content from a software pipeline. Virtual content can include 3D graphical-generated models of objects, avatars, so forth.

Content source 502 provides content to object information identifier 510. Object information identifier 510 includes object attribute identifier 512 which uses received sensor data to determine object attributes 520, such as those discussed above with reference to FIG. 2. Object information identifier 510 also includes object location identifier 514 which uses received sensor data to determine object locations 530. As discussed above with reference to content sources 502, content can derive from the physical environment, and content can also derive from virtual content that are computer-generated. In some examples, object location identifier 514 generates a 2D floorplan representing the positions and dimensions of physical objects with respect to a horizontal plane of the environment, such as the floor as defined using x- and y-coordinates.

In some implementations, object attributes 520 and object location information 530 are packaged to form object information 560. Object information 560 is for example object information 260 as discussed with reference to FIG. 2. The object locations 530 are included in the object information 560, for example, in the form of an optional 2D floorplan 564. The optional 2D floorplan 564 includes a pixel map identifying pixel locations of walls 574a-c and edges of objects 574d-g from a top-down perspective. The object information 560 represents information about the physical environment 105 that enables a graphical environment resembling the physical environment 105 to be generated and used at the same time and/or at a later time.

The presenter 540 provides view 190, for example, during a communication session in which the object information 560 is shared with another device.

Figure 6:
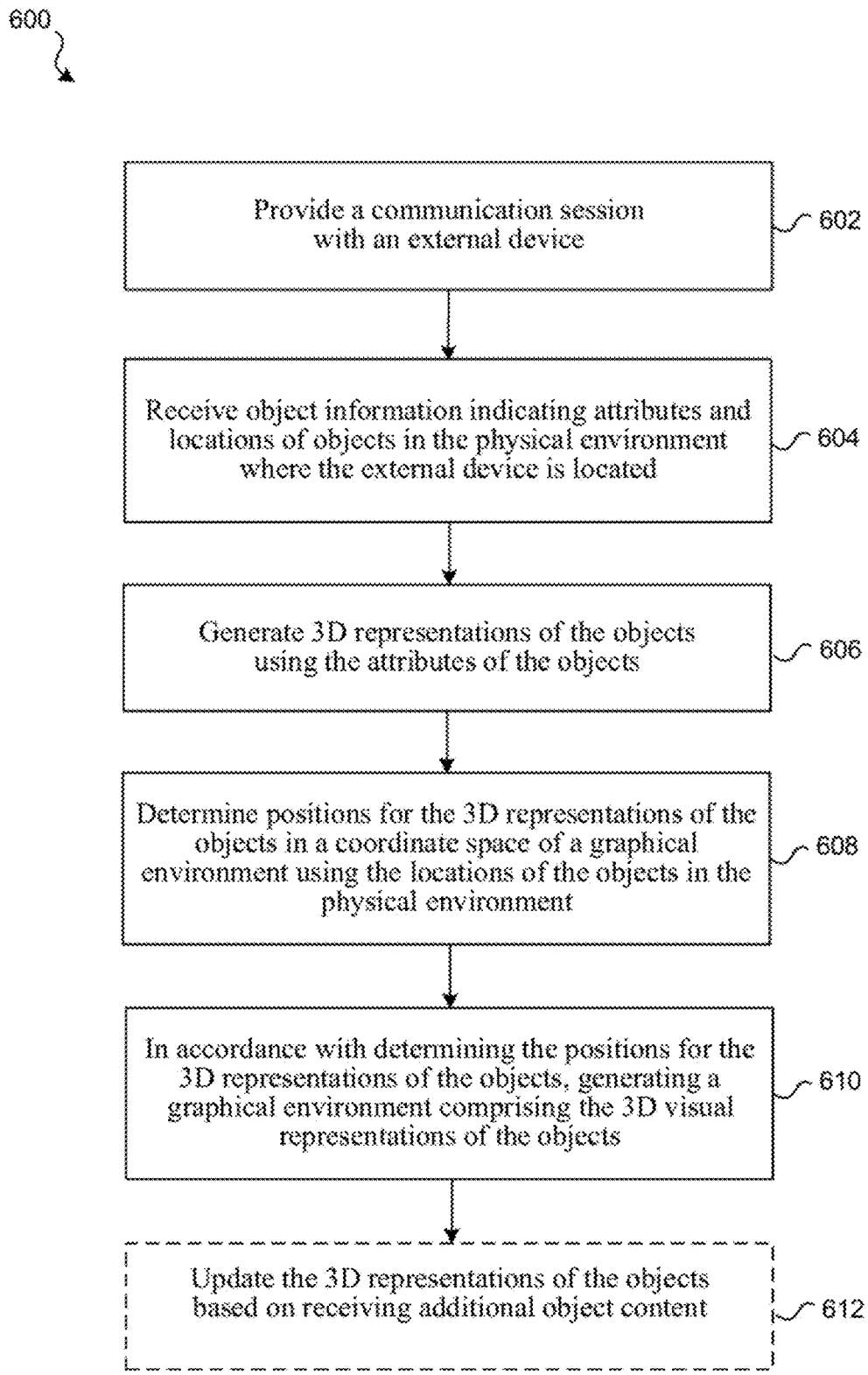
FIG. 6 is a flowchart illustrating receiving object information to facilitate a communication in accordance with some implementations.

FIG. 6 is a flowchart illustrating an exemplary method 600. In some implementations, a receiving device such as device 220 (FIG. 2) performs the techniques of method 600 to use object information that facilitates a communication session in which information regarding a remote physical environment is shared by a remote, external device. In some implementations, the techniques of the method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory).

At block 602, the method 600 provides a communication session with an external device. The communication session may include visual information that enables one or both of the participants in the communication session to share the visual content such as the appearance of a physical environment or objects therein. The communication session may be established via direct communications with the external device, communications via a network, and/or via communications that involve other device's such as one or more servers configured to coordinate information shared between devices during the communication session.

At block 604, the method 600 receives object information indicating attributes and locations of objects in a physical environment in which the external device is located. The attributes and locations of the objects may have been determined using sensor data from one or more image sensors on the external device in the physical environment. In some implementations, the object information includes a 2D floorplan indicating characteristics of the objects in horizontal directions and metadata indicating characteristics of the objects in a third direction. In some implementations, the object information is generated using RGB images and/or depth sensor data of the physical environment. In some implementations, semantic segmentation or other machine learning techniques are used to determine object attributes and locations. Examples of objects include, but are not limited to, tables, chairs, jars, books, walls, ceilings, floors, windows, doors, lights, sound sources, smell sources, etc.

At block 606, the method 600 generates 3D representations of the objects using the attributes of the objects. The 3D representation of an object may be generated based on the object's type, dimensions, size, color, patterns, texture (e.g., normal maps), brand, model, and other attributes. In some implementations, generating the 3D representations may involve selecting a 3D object model via a stored-asset collection or generating a new model based on the attributes. Generating the 3D representations may involve accessing an asset hierarchy according to a specificity level of the object information. For example, for high-level information identifying only that an object is a TV, e.g., generic rectangular cuboid or generic TV may be selected and for more specific information identifying the brand and model number of the TV, a 3D model of the specific brand and model TV may be selected.

In some implementations, the method 600 generates the 3D representation of an object based on predicting the appearance of the object. Such prediction may utilize the object information and/or other information. For example, other information about other objects in the physical environment, the user's preferences, device or space constraints may be used to predict or generate an appropriate appearance for an object. In various implementations, if multiple object variations are possible, the method 600 selects randomly, using selection criteria, or enables a selection by a user. For example, if both a classic style object and a modern style object are possible, the modern style may be selected based on a user preference for modern styles. In other cases, objects are intentionally represented in accordance with a user's preferences. For example, even though the object information may identify that a table has a classic-style, the table may intentionally be represented by a 3D representation that has a modern style based on the user's preference for a modern style.

At block 608, the method 600 determines positions for the 3D representations of the objects in a coordinate space of a graphical environment using the locations of the objects in the physical environment. The position and dimensions of a representation of an object may be determined based on object information. For example, the position may be based on the object information providing a 2D floorplan that identifies the position of the object's perimeter on a horizontal plane (e.g., from a top down perspective) and object attributes that identify the object's height, distance above the floor, distance from the ceiling, etc. A 2D floorplan may provide locations of a perimeter of the object that identify the object's locations and dimensions in two horizontal directions. The object attributes may provide the location and dimension information with respect to a $3^{rd}$ direction. Alternatively, the object attributes may provide information that is used to determine the location and/or dimension information with respect to the $3^{rd}$ direction, e.g., by an asset factory determining the object's height based on looking up the object in an asset factory. For example, an asset factory may identify an asset that is consistent with the object information, e.g., consistent with a 2D perimeter of the object in the 2D floor plan, the object's type, the room type in which the object is located, etc.

In another example, the position for a 3D representation of an object may be determined based on the object information identifying a coordinate (x, y, z) position of a center point of the object, an orientation of the object, and a brand and a model number of the object. In this example, the brand and model number may be used by an asset factory to identify a model with known width, height, and length dimensions and a representation of the object having those dimensions may be positioned based on the center point and oriented based on the orientation.

At block 610, in accordance with determining the 3D positions for the 3D representations of the objects, the method 600 generates a graphical environment having the 3D representations of the objects. The graphical environment may appear similar to the physical environment since it includes representations of the physical environment's objects positioned based on the positions of those objects in the physical environment. During the communication session, a first view of the graphical environment may be presented. In some implementations, the first view of the graphical environment and a corresponding second view of the physical environment at the external device are presented simultaneously.

At block 612, the method 600 optionally updates the 3D representation based on receiving additional object content. In some implementations, updates are received and used to revise a 3D object over time. For example, initially a table may be brown and then changed to a generic wood texture when information identifying that the table is wood arrives, then changed again to oak when more information identifying that the table is oak arrives, and then changed again when a photorealistic image (e.g., a patch) representing a portion of the actual table's appearance arrives.

In some implementations, the method 600 involves receiving updated object information and generating the graphical environment with greater levels of precision incrementally and/or in stages as additional data is received. For example, this may involve, at a first instance, generating the 3D representations of an object at a lower level of fidelity responsive to receiving a portion of object information and, at a second instance, generating the 3D representations of the object at a higher level of fidelity responsive to receiving additional portions of the object information. The representations may be updated when the user looks away or using a transition effect, e.g., a particle effect to distract the user during the transition.

Figure 7:
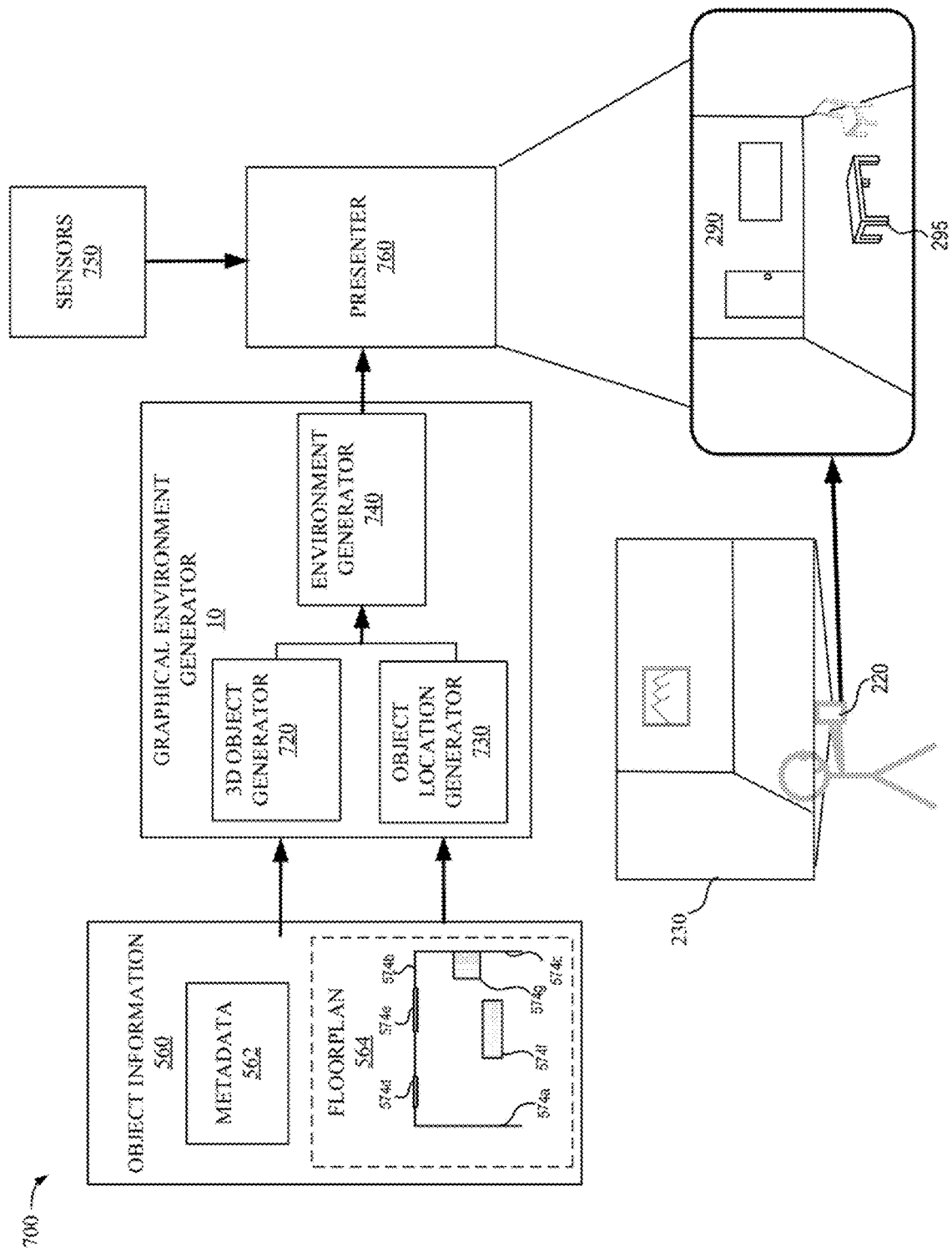
FIG. 7 illustrates generating a view of a graphical environment using object information in accordance with some implementations.

FIG. 7 illustrates techniques 700 for generating a graphical environment using object information in accordance with some implementations. In this example, a graphical environment generator 710 receives object information 560. The object information 560 can include metadata 562 and/or object location information such as optional 2D floorplan 564. The graphical environment generator 710 includes a 3D object generator 720 that uses the object information 560 to generate 3D representations of the objects. The graphical environment generator 710 also includes an object location generator 730 that uses object information 560 to determine positions for the 3D representations of the objects. The graphical environment generator 710 also includes an environment generator 740 that generates a graphical environment using the 3D representations and positions. The presenter 760 uses information from sensors 750 (e.g., providing a position and/or movement of the device 220) to present a view 290 of the graphical environment.

In the example of FIG. 7, the device 220 is in a physical environment 230 that differs from physical environment 105 (FIG. 5). The view 290 of the graphical environment is similar to the view 190 of the physical environment provided at the device 120 in FIG. 5. The similarity of the views 290, 190 may depend upon the amount of detail included in the object information 560. For example, the view 290 of the generated 3D representations (e.g., table 295) may have some differences with respect to the view 190 of the real objects (e.g., table 195) of physical environment 105.

FIG. 8 illustrates the communication session of FIG. 2 updated based on updated object information in accordance with some implementations. In this example, during the communication session of FIG. 2, device 120 continues to provide a view 190 of the physical environment 105 while sharing updated object information 860 with the device 220 of the second user. The device 220 receives the updated object information 860 and uses it to generate an updated graphical environment including an updated 3D representation of the table 195 and display a corresponding updated view 890 of the graphical environment. The updated view 890 includes including a second representation 895 of the table 195 that is updated to more closely correspond to table 195 than the first representation 295.

Various implementations disclosed herein enable multiple users to share their physical environments with one another during communication sessions. In one example, multiple users in a communication session are able to see, hear, smell, etc. the physical environment of one of the users. Such a shared environment could potentially be facilitated by the first user's device generating a dense 3D reconstruction of the physical environment proximate the first user and sending it to the second user's device. However, the processing, storage, transmission, and other requirements of such a scenario may be significant, particularly if the dense 3D reconstruction includes millions of data points representing realistic or fine-grained details. Moreover, the 3D reconstruction may not be as accurate as the users would like, e.g., the desk may lack details that make the experience desirable.

Some implementations reduce the data required to create, store, share, and use representations of the 3D environments by reducing or eliminating the need for dense/point-specific 3D geometric representation data. Some implementations use object information, e.g., to represent the environment semantically or otherwise provide a semantic understanding of the physical environment, to reduce or eliminate the need for point specific geometric representation data. For example, in some implementations such object information includes a 2D floorplan that indicates where objects are located in two dimensions and metadata that indicates where walls are, the heights of the walls, the heights of objects such as table, the materials (e.g., wood, metal, etc.) of objects, etc. In some implementations, a dense 3D reconstruction can be reconstructed using such object information. In some implementations, a backend asset factory uses the object information and executes procedural modeling to recreate a physical environment that was previously modeled as a dense 3D reconstruction. The re-creation using the object information may be cleaner (e.g., with fewer or no artifacts of the dense 3D reconstruction). The re-creation can include some intentional variations from the original physical environment and/or its dense 3D reconstruction. For example, the attributes may indicate a modern-style table, but the room may be recreated with a Victorian-style based on a user preference to replace furniture with a user-specified Victorian style.

Some implementations use object information to accelerate the transfer and use of representations of physical environments. Sending object information initially rather than dense 3D reconstruction data, may enable faster transmission and representation of a physical environment. For example, during a communication session, a subset of the physical environment represented by a subset of object information may be provided and displayed by the receiving device. As additional object information is generated and transferred, the object representations may be updated and/or replaced. As a specific example, a brown circle that is initially displayed to represent a generic table may be replaced by a more specific table corresponding to the table in the physical environment based on the receipt of additional object information identifying the specific table or its characteristics.

In some implementations, both object information and dense 3D reconstruction data are used. For example, the object information may be used initially to provide the graphical environment initially and then replaced at latter points in time as 3D reconstruction data is received.

In some implementations, object information may omit (intentionally) certain objects or characteristics of a physical environment. For example, for privacy reasons, a person sharing a physical environment (e.g., a master bedroom) that includes personal items or clutter may not want to share all such items or clutter. User preferences may dictate that the object information only include basic representations that include only certain types of objects (e.g., including tables and chairs and excluding clothing and food containers, etc.).

The object information used in the various implementations disclosed herein may include information about the physical appearances of items in the physical environment as well as information about the lighting, acoustics, smells, environmental cues, and other aspects of the physical environment.

In some implementations, object information about a physical environment that can be used to generate a graphical environment to enable editing or modeling applications. For example, a graphical user interface (GUI) may display and enable editing of a graphical environment by displaying the graphical environment and or some of the object information (e.g., a 2D floorplan and/or a list of object attributes). The user interface of such an application may display a view of the graphical environment and a 2D floorplan simultaneously and synchronize changes made with respect to one on the other. A user may edit a 2D floorplan and those changes used to automatically determine corresponding changes to a 3D graphical environment corresponding to a physical environment. For example, a user may create a graphical environment and 2D floorplan corresponding to his or her dining room and then make changes to plan and visualize a remodel project. It may be easier to make such changes by interacting with the 2D floorplan than a view of the 3D graphical environment. In another example, a user, such as an interior designer, could use sensors to 3D model a room or other physical environment, make proposed revisions, and send the revised 3D environment (represented by relatively compact object information) to his or her clients for review and comment.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing program instructions executable on a first device to perform operations comprising:
    providing a communication session with a second device via wireless communication;
    receiving object information indicating attributes and locations of objects in a physical environment in which the second device is located, wherein the attributes and locations of the objects are determined using sensor data captured by one or more image sensors in the physical environment;
    generating three-dimensional (3D) visual representations of the objects using the attributes of the objects in the physical environment;
    determining 3D positions for the visual representations of the objects in a coordinate space of a graphical environment using the locations of the objects in the physical environment; and
    in accordance with the determined positions for the 3D visual representations of the objects, generating a graphical environment comprising the generated 3D visual representations of the objects at 3D positions within the 3D graphical environment based on the locations of the objects in the physical environment, wherein, during the communication session, a first view of the graphical environment at the first device and a second view of the physical environment at the second device are presented simultaneously.

2. The non-transitory computer-readable storage medium of claim 1, wherein the generated visual representations are three-dimensional (3D), and wherein the object information comprises a two-dimensional (2D) map indicating characteristics of the objects in two coordinate directions and metadata indicating characteristics of the objects in a third coordinate direction.

3. The non-transitory computer-readable storage medium of claim 1, wherein the generated visual representations are three-dimensional (3D), and wherein the object information comprises a two-dimensional (2D) floorplan indicating the locations of the objects in the physical environment with respect to a horizontal plane.

4. The non-transitory computer-readable storage medium of claim 1, wherein the attributes of the objects in the object information comprise heights of the objects above a horizontal plane of the physical environment, the heights determined based on a depth sensor in the physical environment.

5. The non-transitory computer-readable storage medium of claim 1, wherein the attributes of the objects in the object information comprise types of the objects.

6. The non-transitory computer-readable storage medium of claim 5, wherein the types of the objects are determined via a semantic segmentation machine learning model applied to one or more images of the physical environment.

7. The non-transitory computer-readable storage medium of claim 1, wherein generating the graphical environment further comprises:
    generating the visual representations of the objects at a lower level of fidelity responsive to receiving first object information, and generating the visual representations of the objects at a higher level of fidelity responsive to receiving an additional second object information of the objects.

8. The non-transitory computer-readable storage medium of claim 7, wherein the generated visual representations of the objects at the higher level of fidelity include photorealistic content, and wherein the generated visual representations of the objects at the lower level of fidelity do not include photorealistic content.

9. The non-transitory computer-readable storage medium of claim 1, wherein the graphical environment further comprises a virtual object, wherein both the first view and the second view comprise the virtual object.

10. The non-transitory computer-readable storage medium of claim 1, wherein:
    the second view comprises a first avatar corresponding to the first device; and
    the first view comprises a second avatar corresponding to the second device.

11. The non-transitory computer-readable storage medium of claim 1, wherein the sensor data comprises light intensity image data and depth data.

12. A first system comprising:
    a non-transitory computer-readable storage medium;
    a display;
    one or more sensors, the one or more sensors comprising an inertial measurement unit sensor or a depth sensor; and
    one or more processors coupled to the non-transitory computer-readable storage medium, wherein the non-transitory computer-readable storage medium comprises program instructions that, when executed on the one or more processors, cause the system to perform operations comprising:
    providing a communication session with a second device via wireless communication;
    receiving object information indicating attributes and locations of objects in a physical environment in which the second device is located, wherein the attributes and locations of the objects are determined using sensor data captured by one or more image sensors in the physical environment;

generating three-dimensional (3D) visual representations of the objects using the attributes of the objects in the physical environment;
determining 3D positions for the visual representations of the objects in a coordinate space of a graphical environment using the locations of the objects in the physical environment; and
in accordance with the determined positions for the 3D visual representations of the objects, generating a graphical environment comprising the generated 3D visual representations of the objects at 3D positions within the 3D graphical environment based on the locations of the objects in the physical environment, wherein, during the communication session, a first view of the graphical environment at the first device and a second view of the physical environment at the second device are presented simultaneously.

13. The system of claim 12, wherein the generated visual representations are three-dimensional (3D), and wherein the object information comprises a two-dimensional (2D) floorplan indicating the locations of the objects in the physical environment with respect to a horizontal plane.

14. The system of claim 12, wherein the attributes of the objects in the object information comprise heights of the objects above a horizontal plane of the physical environment determined using a depth sensor in the physical environment.

15. The system of claim 12, wherein the attributes of the objects in the object information comprise types of the objects, the types of the objects determined via a semantic segmentation machine learning model applied to one or more images of the physical environment.

16. The system of claim 12, wherein generating the graphical environment further comprises: generating the visual representations of the objects at a lower level of fidelity responsive to receiving first object information, and generating the visual representations of the objects at a higher level of fidelity responsive to receiving an additional second object information of the objects.

17. A method comprising:
at a processor of a first device:
providing a communication session with a second device via wireless communication;
receiving object information indicating attributes and locations of objects in a physical environment in which the second device is located, wherein the attributes and locations of the objects are determined using sensor data captured by one or more image sensors in the physical environment;
generating three-dimensional (3D) visual representations of the objects using the attributes of the objects in the physical environment;
determining 3D positions for the visual representations of the objects in a coordinate space of a graphical environment using the locations of the objects in the physical environment; and
in accordance with the determined positions for the 3D visual representations of the objects, generating a graphical environment comprising the generated 3D visual representations of the objects at 3D positions within the 3D graphical environment based on the locations of the objects in the physical environment, wherein, during the communication session, a first view of the graphical environment at the first device and a second view of the physical environment at the second device are presented simultaneously.

18. The method of claim 17, wherein the generated visual representations are three-dimensional (3D), and the object information comprises a two-dimensional (2D) floorplan indicating the locations of the objects in the physical environment with respect to a horizontal plane.

19. The method of claim 17, wherein the generated visual representations are three-dimensional (3D), and the attributes of the objects in the object information comprise heights of the objects above a horizontal plane of the physical environment determined using a depth sensor in the physical environment.

20. The method of claim 17, wherein the attributes of the objects in the object information comprise types of the objects, the types of the objects determined via a semantic segmentation machine learning model applied to one or more images of the physical environment.

21. The method of claim 17, wherein generating the graphical environment further comprises:
generating the visual representations of the objects at a lower level of fidelity responsive to receiving first object information, and generating the visual representations of the objects at a higher level of fidelity responsive to receiving an additional second object information of the objects.

22. The method of claim 17, wherein the object information identifies dimensions of the objects with respect to three coordinate directions.

23. The method of claim 17, wherein the object information identifies height, width, and depth dimensions of the objects.

* * * * *